(12) United States Patent
Kashima

(10) Patent No.: US 6,961,106 B2
(45) Date of Patent: Nov. 1, 2005

(54) RETARDATION OPTICAL ELEMENT HAVING THE FUNCTION OF REFLECTING ULTRAVIOLET LIGHT, AND LIQUID CRYSTAL DISPLAY COMPRISING THE SAME

(75) Inventor: Keiji Kashima, Tokyo-To (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 102 days.

(21) Appl. No.: 10/662,124

(22) Filed: Sep. 15, 2003

(65) Prior Publication Data

US 2004/0212766 A1 Oct. 28, 2004

(30) Foreign Application Priority Data

Sep. 13, 2002 (JP) ........................................ 2002-268066

(51) Int. Cl.[7] .............................................. G02F 1/1335
(52) U.S. Cl. ...................................... 349/117; 349/118
(58) Field of Search .................................. 349/117, 118

(56) References Cited

U.S. PATENT DOCUMENTS

2004/0095532 A1 * 5/2004 Parri et al. .................. 349/117

FOREIGN PATENT DOCUMENTS

| JP | 57-165480 | 10/1982 |
| JP | 07-258638 | 10/1995 |
| JP | 09-080400 | 3/1997 |
| JP | 09-133810 | 5/1997 |
| JP | 10-508882 | 9/1998 |
| JP | 11-293252 | 10/1999 |

* cited by examiner

Primary Examiner—James A. Dudek
(74) Attorney, Agent, or Firm—Oliff & Berridge, PLC

(57) ABSTRACT

The present invention provides an inexpensive retardation optical element having the function of reflecting ultraviolet light, capable of decreasing the amount of ultraviolet light that enters a liquid crystal cell, and a liquid crystal display comprising such a retardation optical element. A retardation optical element having the function of reflecting ultraviolet light 10 comprises a retardation layer 12 having a cholesteric liquid crystalline molecular structure in planar orientation. The retardation layer 12 is made so that at least part of its selective reflection wave range for light, which the retardation layer 12 selectively reflects, due to its liquid crystalline molecular structure, is included in an ultraviolet region of 100 to 400 nm and that the maximum reflectance for light in this ultraviolet region is 30% or more.

6 Claims, 7 Drawing Sheets

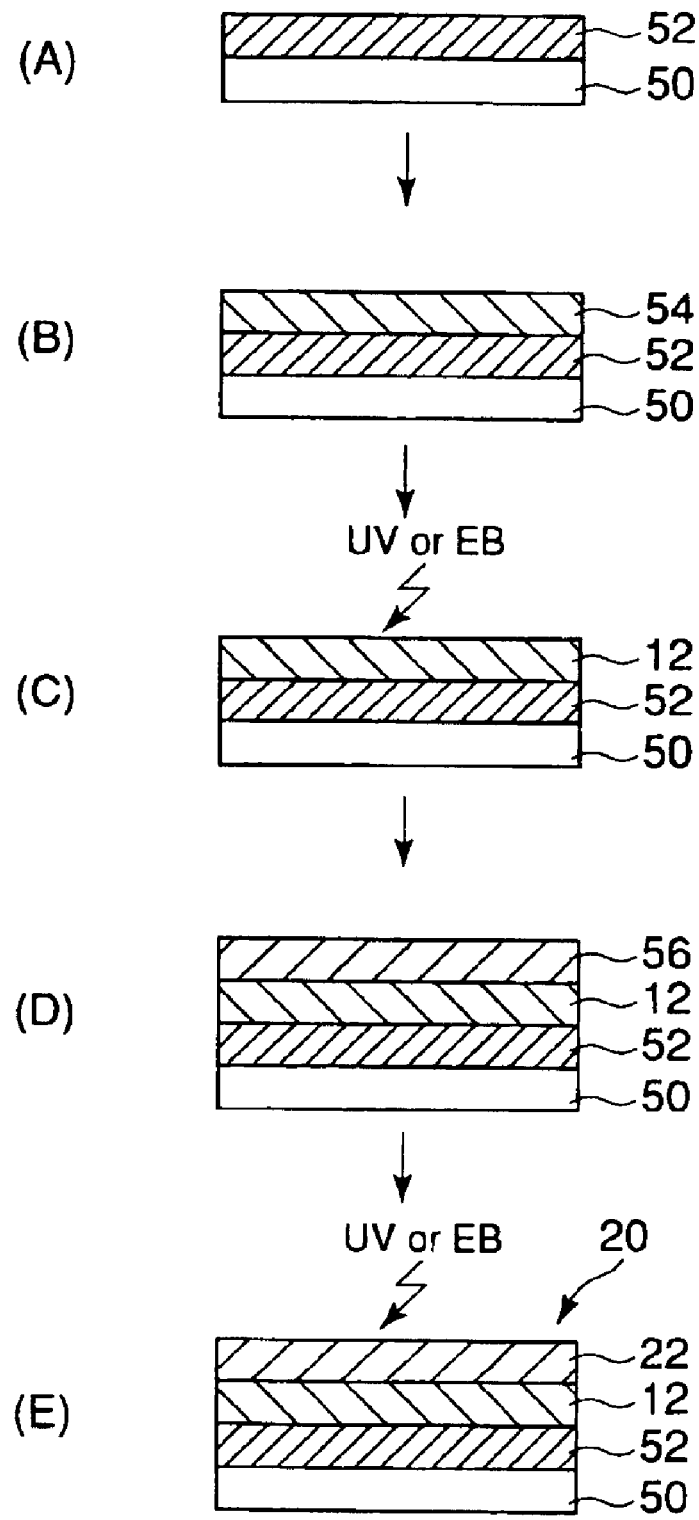
F I G. 7

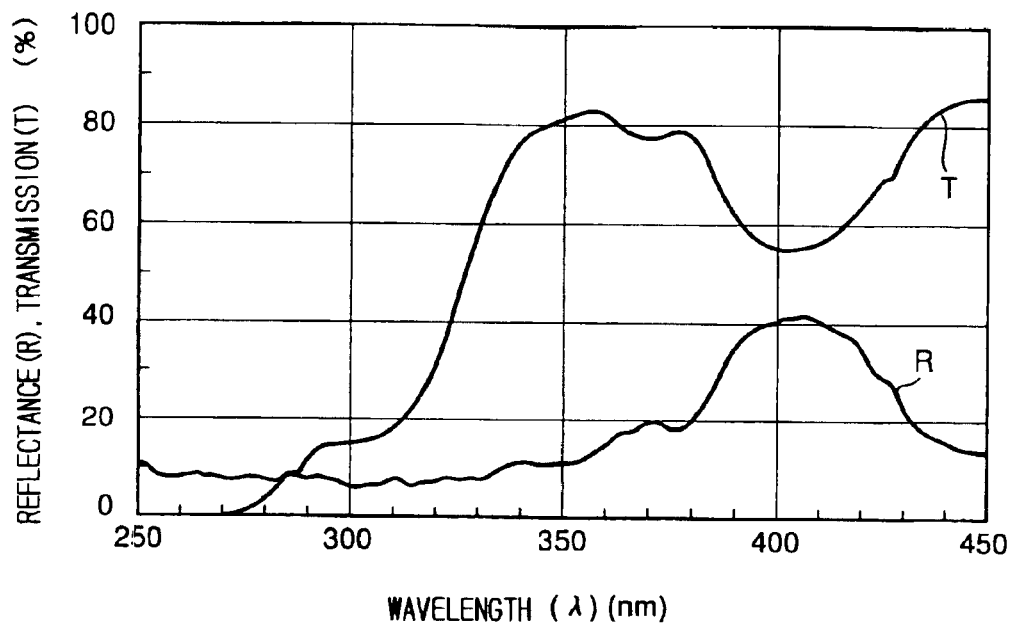
F I G. 10
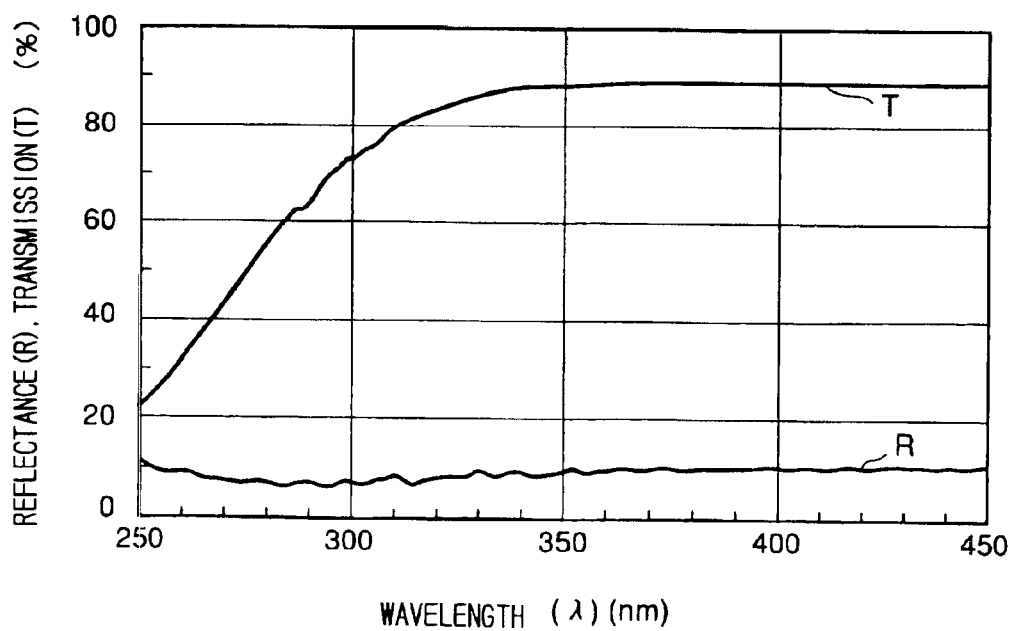
F I G. 11

RETARDATION OPTICAL ELEMENT HAVING THE FUNCTION OF REFLECTING ULTRAVIOLET LIGHT, AND LIQUID CRYSTAL DISPLAY COMPRISING THE SAME

BACKGROUND OF THE INVENTION

1. Field of the Invention

The present invention relates to a retardation optical element for use in a liquid crystal display or the like, particularly a retardation optical element having the function of reflecting ultraviolet light, capable of decreasing the amount of ultraviolet light that enters a liquid crystal cell, and to a liquid crystal display comprising such a retardation optical element.

2. Description of Related Art

FIG. 12 is an exploded, diagrammatic perspective view showing the structure of a conventional liquid crystal display.

As shown in FIG. 12, the conventional liquid crystal display 100 comprises a polarization layer 102A on the incident side, a polarization layer 102B on the emergent side, a liquid crystal cell 104, a back light unit 106, and a retardation layer 108.

Of these component parts, the polarization layers 102A and 102B are made so that they selectively transmit only linearly polarized light having a plane of vibration in a predetermined direction, and are arranged in the cross nicol disposition so that the direction of vibration of linearly polarized light which the polarization layer 102A transmits is perpendicular to that of vibration of linearly polarized light which the polarization layer 102B transmits. The liquid crystal cell 104 comprises a large number of cells corresponding to pixels and is placed between the polarization layers 102A and 102B. The retardation layer 108 is a birefringent layer useful, for example, for providing compensation for viewing angle dependency or the like, and is placed on one side, relative to the direction of thickness, of the liquid crystal cell 104. Besides, there also exists a liquid crystal display comprising retardation layers 108 that are placed on both sides, relative to the direction of thickness, of a liquid crystal cell 104.

The case where the liquid crystal cell 104 in the above-described liquid crystal display 100 is of VA (Vertical Alignment) mode, in which a nematic liquid crystal having negative dielectric anisotropy is sealed in the liquid crystal cell, is now taken as an example. Light emitted from the back light unit 106 passes through the polarization layer 102A on the incident side and becomes linearly polarized light. This linearly polarized light passes, without undergoing phase shift, through those cells in the liquid crystal cell 104 that are in the non-driven state, and is blocked by the polarization layer 102B on the emergent side. On the contrary, the linearly polarized light undergoes phase shift as it passes through those cells in the liquid crystal cell 104 that are in the driven state, and the light in an amount corresponding to the amount of this phase shift passes through and emerges from the polarization layer 102B on the emergent side. It is therefore possible to display the desired image on the emergent-side polarization layer 102B side by properly controlling the driving voltage that is applied to each cell in the liquid crystal cell 104. There exists not only a liquid crystal display 100 of the above-described type in which light is transmitted and blocked in the above-described manner, but also a liquid crystal display that is so constructed that light emerging from those cells in a liquid crystal cell 104 that are in the non-driven state passes through and emerges from a polarization layer 102B on the emergent side, and that light emerging from those cells that are in the driven state is blocked by the polarization layer 102B on the emergent side.

In general, a liquid crystal sealed in the liquid crystal cell 104 is apt to undergo deterioration by ultraviolet light, and its optical properties can change due to this deterioration. Specifically, for example, light emitted from the back light unit 106 using a conventional fluorescent lamp contains ultraviolet rays, and these ultraviolet rays enter the liquid crystal cell 104 via the polarization layer 102A on the incident side to deteriorate the liquid crystal in the liquid crystal cell 104. Moreover, sunlight and extraneous light such as light emitted from electric lamps (fluorescent lamps, etc.) also contain ultraviolet rays, and these ultraviolet rays also enter the liquid crystal cell 104 via the polarization layer 102B on the emergent side to deteriorate the liquid crystal contained in the liquid crystal cell 104. As the liquid crystal contained in the liquid crystal cell 104 deteriorates in this manner, the quality of the image displayed on the liquid crystal display 100 lowers.

Mercury in a fluorescent lamp emits rays of 185 nm, 254 nm, 305 nm and 365 nm, and it is known that, of these, a ray of 365 nm passes through the glass tube of a fluorescent lamp and is discharged to the outside. Further, sunlight contains rays that are classified, in the order of decreasing wavelength, into UVA (315 to 400 nm), UVB (280 to 315 nm) and UVC (100 to 280 nm). It has been considered that, of these rays, only UVA and UVB reach the surface of the earth and that UVC is absorbed by ozone and hardly reaches the surface of the earth. However, such a phenomenon that the ozone layer over Antarctica disappears is observed in recent years, and not only UVA and UVB but also UVC is now known to reach the surface of the earth.

Under these circumstances, there has been known a liquid crystal display in which an ultraviolet absorber is, in order to decrease the amount of ultraviolet light that enters a liquid crystal cell, incorporated in films such as polarization layers to be placed on both sides, relative to the direction of thickness, of the liquid crystal cell (see pages 1 to 4 of Japanese Laid-Open Patent Publication No. 80400/1997).

However, the liquid crystal display described in Japanese Laid-Open Patent Publication No. 80400/1997 has the following drawback: since an ultraviolet absorber is incorporated in films such as polarization layers, the film-forming process becomes complicated to increase the cost of production of the liquid crystal display.

SUMMARY OF THE INVENTION

The present invention has been accomplished in the light of the aforementioned problems. An object of the present invention is to provide an inexpensive retardation optical element having the function of reflecting ultraviolet light, capable of decreasing the amount of ultraviolet light that enters a liquid crystal cell, and a liquid crystal display comprising such a retardation optical element.

The present invention provides, as a first aspect of the invention, a retardation optical element having the function of reflecting ultraviolet light. The retardation optical element comprises a retardation layer that has a cholesteric liquid crystalline molecular structure and acts as a negative C plate, wherein the retardation layer is made so that at least part of its selective reflection wave range is included in an ultraviolet region of 100 to 400 nm and that the maximum reflectance for light in the ultraviolet region is 30% or more.

In the first aspect of the invention, the structure of the retardation layer is preferably that of a chiral nematic liquid crystal that has been three-dimensionally cross-linked and solidified. Alternatively, the structure of the retardation layer may be that of a polymeric liquid crystal that has been solidified into the glassy state.

Furthermore, in the first aspect of the invention, it is preferable that the retardation optical element further comprises an additional retardation layer laminated to the above-described retardation layer, the additional retardation layer having a selective reflection wave range different in the ultraviolet region from that of the above-described retardation layer.

The present invention provides, as a second aspect of the invention, a retardation optical element having the function of reflecting ultraviolet light. The retardation optical element comprises: a first retardation layer that has a cholesteric liquid crystalline molecular structure and acts as a negative C plate; and a second retardation layer laminated to the first retardation layer, the second retardation layer having a cholesteric liquid crystalline molecular structure and acts as a negative C plate, wherein the first and second retardation layers are made so that the direction of twisting of liquid crystalline molecules in the first retardation layer is opposite to that of twisting of liquid crystalline molecules in the second retardation layer, that at least part of the selective reflection wave range of the first retardation layer and at least part of the selective reflection wave range of the second retardation layer are both included in an ultraviolet region of 100 to 400 nm, and that the maximum reflectance for light in the ultraviolet region is 60% or more as a whole.

In the second aspect of the invention, the structure of the first retardation layer and that of the second retardation layer are preferably those of chiral nematic liquid crystals that have been three-dimensionally cross-linked and solidified. In this case, it is preferable that the first and second retardation layers contain substantially the same nematic liquid crystal component and that the direction of twisting of liquid crystalline molecules in the first retardation layer be made opposite to that of twisting of liquid crystalline molecules in the second retardation layer by varying the type of a chiral agent component that is added to the nematic liquid crystal component. The structure of the first retardation layer and that of the second retardation layer may also be those of polymeric liquid crystals that have been solidified into the glassy state.

Furthermore, in the second aspect of the invention, it is preferable that the retardation optical element further comprises an additional retardation layer laminated to the first or second retardation layer, the additional retardation layer having a selective reflection wave range different in the ultraviolet region from that of the first or second retardation layer.

The present invention provides, as a third aspect of the invention, a liquid crystal display comprising: a liquid crystal cell; and a retardation optical element according to the above-described first or second aspects of the invention, the retardation optical element being placed on at least one side, relative to the direction of thickness, of the liquid crystal cell, wherein the retardation optical element selectively reflects light in a predetermined state of polarization, in an ultraviolet region that constitutes a part of its selective reflection wave range, thereby decreasing the amount of ultraviolet light that enters the liquid crystal cell.

According to the first aspect of the invention, since the retardation layer is made so that at least part of its selective reflection wave range is included in an ultraviolet region of 100 to 400 nm and that the maximum reflectance for light in this ultraviolet region is 30% or more, the retardation optical element can selectively reflect, at high percentages, ultraviolet light in the specific state of polarization, contained in incident light. Therefore, even when incorporated into a liquid crystal display or the like, the retardation optical element can effectively decrease the amount of ultraviolet light that enters a liquid crystal cell. Moreover, it is not necessary to add an ultraviolet absorber or the like to impart the function of reflecting ultraviolet light to the retardation optical element, so that it is possible to produce the retardation optical element at low cost.

Further, in the first aspect of the invention, if the cholesteric liquid crystalline molecular structure of the retardation layer is obtained as the structure of a chiral nematic liquid crystal that has been three-dimensionally cross-linked and solidified, it is possible to thermally stably retain this structure.

Furthermore, in the first aspect of the invention, if an additional retardation layer having a selective reflection wave range whose ultraviolet region part is different from that of the selective reflection wave range of the retardation layer is further laminated to the retardation layer, it becomes possible to reflect, as a whole, a larger amount of ultraviolet light while keeping each retardation layer thin. The amount of ultraviolet light that enters a liquid crystal cell can thus be decreased more effectively.

According to the second aspect of the invention, the first and second retardation layers are made so that the direction of twisting of liquid crystalline molecules in the first retardation layer is opposite to that of twisting of liquid crystalline molecules in the second retardation layer, that at least part of the selective reflection wave range of the first retardation layer and at least part of the selective reflection wave range of the second retardation layer are both included in an ultraviolet region of 100 to 400 nm, and that the maximum reflectance for light in the ultraviolet region is 60% or more as a whole, so that reflection of light in one state of polarization (e.g., right-handed circularly polarized light), contained in incident light, can be effected by the first retardation layer and that reflection of light in the other state of polarization (e.g., left-handed circularly polarized light), contained in the incident light, can be effected by the second retardation layer. For this reason, when incorporated into a liquid crystal display or the like, this retardation optical element can decrease the amount of ultraviolet light that enters a liquid crystal cell more effectively than a single-layer retardation optical element having the function of reflecting ultraviolet light, which comprises only one retardation layer that selectively reflects light in one state of polarization only.

Further, in the second aspect of the present invention, if the cholesteric liquid crystalline molecular structure of the first retardation layer and that of the second retardation layer are obtained as the structures of chiral nematic liquid crystals that have been three-dimensionally cross-linked and solidified, it is possible to thermally stably retain these structures. In this case, if the first and second retardation layers are made to contain substantially the same nematic liquid crystal component, and if the direction of twisting of liquid crystalline molecules in the first retardation layer is made opposite to that of liquid crystalline molecules in the second retardation layer by varying the type of a chiral agent component that is added to the nematic liquid crystal component, the difference between the refractive index of the first retardation layer and that of the second retardation layer becomes small. As a result, occurrence of interfacial reflection in the retardation optical element having the function of reflecting ultraviolet light is prevented, and lowering of contrast can thus be prevented more effectively.

Furthermore, in the second aspect of the invention, if an additional retardation layer having a selective reflection wave range different in the ultraviolet region from that of the first or second retardation is further laminated to the first or second retardation layer, it becomes possible to reflect, as a whole, a larger amount of ultraviolet light while keeping each retardation layer thin, and the amount of ultraviolet light that enters a liquid crystal cell can thus be decreased more effectively.

According to the third aspect of the present invention, the liquid crystal display comprises the retardation optical element having the function of reflecting ultraviolet light, capable of decreasing the amount of ultraviolet light that enters the liquid crystal cell, so that the liquid crystal sealed in the liquid crystal cell hardly undergoes deterioration. A liquid crystal display excellent in durability and reliability can thus be obtained. Further, the retardation optical element that is incorporated into the liquid crystal display has not only the function of reflecting ultraviolet light but also the function of providing optical compensation utilizing phase shift or the like, so that the liquid crystal display requires only a decreased number of parts. It is therefore possible to produce, at low cost, a liquid crystal display that is compact and excellent in durability.

BRIEF DESCRIPTION OF THE DRAWINGS

FIG. 7 is a diagrammatic cross-sectional view illustrating a process of producing the retardation optical element having the function of reflecting ultraviolet light, shown in FIG. 2;

FIG. 10 is a graph showing the relationships between reflectance R (%) and wavelength λ (nm) and between transmission T (%) and wavelength λ (nm) in the single-layer retardation optical element of Example 3, having the function of reflecting ultraviolet light;

FIG. 11 is a graph showing the relationships between reflectance R (%) and wavelength λ (nm) and between transmission T (%) and wavelength λ (nm) in the transparent glass of Comparative Example.

DETAILED DESCRIPTION OF PREFERRED EMBODIMENTS

By referring to the accompanying drawings, embodiments of the present invention will be described hereinafter.

A retardation optical element having the function of reflecting ultraviolet light, according to this embodiment, is firstly described with reference to FIG. 1.

Figure 1:
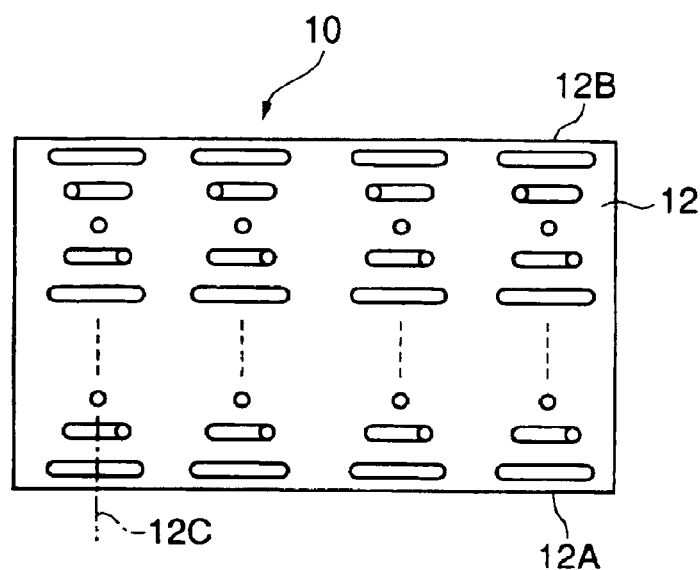
FIG. 1 is a sectional side view diagrammatically showing the structure of a retardation optical element having the function of reflecting ultraviolet light, according to an embodiment of the present invention.

As shown in FIG. 1, the retardation optical element 10 having the function of reflecting ultraviolet light comprises a retardation layer 12 that has a cholesteric liquid crystalline molecular structure in planar orientation and acts as a negative C plate. The term "liquid crystalline molecules" is usually used to indicate molecules having both the fluidity of liquid and the anisotropy of crystal. In this specification, however, the term "liquid crystalline molecules" is also used, for convenience' sake, to indicate those molecules that have been solidified with the anisotropy which the molecules possessed when they were in the fluid state retained.

The retardation layer 12 has a cholesteric liquid crystalline molecular structure, so that it has the rotated-light-selecting property (polarized-light-separating property) of separating a component optically rotated (circularly polarized) in one direction from a component optically rotated in the opposite direction according to the orientation (planar orientation) of molecules of a liquid crystal.

This phenomenon is known as circular dichroism. If the direction of twisting (direction of rotation) of a helical structure consisting of liquid crystalline molecules is properly selected, a component circularly polarized in the same direction as this direction of twisting is selectively reflected.

In this case, the scattering of optically rotated, polarized light becomes maximum (selective reflection is peaked) at the wavelength λ0 given by the following equation (1):

$$\lambda 0 = \Delta nav \cdot p, \quad (1)$$

wherein p is the helical pitch in the helical structure consisting of liquid crystalline molecules (i.e., the length of one pitch in the molecular helix consisting of liquid crystalline molecules), and nav is the mean refractive index of a plane perpendicular to the helical axis 12C of liquid crystalline molecules in planar orientation.

On the other hand, the width Δλ of the wave range in which the wavelength of light that is selectively reflected falls is given by the following equation (2):

$$\Delta\lambda = \Delta n \cdot p, \quad (2)$$

wherein Δn is the birefringence value.

Namely, with respect to non-polarized light that enters the retardation layer 12 having such a cholesteric liquid crystalline structure, along the helical axis 12C of liquid crystalline molecules in planar orientation, either one of the right- and left-handed circularly polarized components of light in the selective reflection wave range with the central wavelength λ0 and the width Δλ is reflected owing to the above-described polarized-light-separating property, and the other circularly polarized component of the light and light (non-polarized light) not in this selective reflection wave range are transmitted. For example, when the direction of twisting (direction of rotation) of liquid crystalline molecules is right-handed, the right-handed circularly polarized component is reflected, and when the direction of twisting (direction of rotation) of liquid crystalline molecules is left-handed, the left-handed circularly polarized component is reflected. It is noted that the right- or left-handed circularly polarized component is reflected without undergoing reversion of the direction of rotation (phase) unlike in the case of ordinary reflection of light.

The retardation layer 12 is made so that at least part of its selective reflection wave range for light, which the retardation layer 12 selectively reflects due to its liquid crystalline molecular structure as described above, is included in an ultraviolet region of 100 to 400 nm and that the maximum reflectance for light in this ultraviolet region is 30% or more, more preferably 35% or more. The reflectance for light in such a selective reflection wave range (ultraviolet region) can be varied by controlling the thickness of the retardation layer 12 (more strictly, the number (helical pitch number) of molecular helixes with a helical pitch that is determined by the above equation (1)).

If the retardation layer 12 is so made, it can selectively reflect, at high percentages, ultraviolet light in the specific state of polarization, contained in incident light. Therefore, even when incorporated into a liquid crystal display, the retardation optical element can effectively decrease the amount of ultraviolet light that enters a liquid crystal cell. Further, it is not necessary to add an ultraviolet absorber or the like in order to impart the function of reflecting ultraviolet light to the retardation optical element, so that it is possible to produce the retardation optical element at low cost. If the selective reflection wave range for light, which the retardation layer selectively reflects due to the liquid crystalline molecular structure of the retardation layer, is controlled such that a large part of it is included in an ultraviolet region of 100 to 400 nm, the retardation layer can effectively prevent reflection of visible light (wave range: approximately 400 to 800 nm). Such a retardation optical element can function as an ultraviolet filter, and, at the same time, can effectively avoid coloring that occurs when it reflects visible light.

The retardation layer 12 is anisotropic, that is, birefringent, and its refractive index in the direction of thickness is different from that in the direction of plane, so that it acts as a negative C plate, as mentioned above. Namely, if, in the three-dimensional rectangular coordinate system, the refractive indices of the retardation layer 12 in the direction of plane are indicated by Nx and Ny and that in the direction of thickness is indicated by Nz, these indices are in the relationship Nx=Ny>Nz. Therefore, in the case where linearly polarized light is incident on the retardation layer 12, the linearly polarized light that has entered in the direction of the helical axis 12C of the retardation layer 12 passes through the retardation layer 12 without undergoing phase shift, while the linearly polarized light that has entered in the direction deviating from the helical axis 12C of the retardation layer 12 undergoes phase shift as it passes through the retardation layer 12 to become elliptically polarized light. On the contrary, it is also possible to convert, into linearly polarized light, elliptically polarized light that has entered the retardation layer 12 in the direction deviating from the helical axis 12C of the retardation layer 12. For this reason, the retardation layer 12 has the function of providing compensation for the viewing angle dependency or the like of a liquid crystal display (the function of providing optical compensation).

With respect to liquid crystalline molecules on two opposite main surfaces (larger surfaces) 12A and 12B of the retardation layer 12, extending perpendicular to the direction of thickness, it is preferable that the directions of the directors of liquid crystalline molecules on the entire area of the surface 12A be substantially the same and that the directions of the directors of liquid crystalline molecules on the entire area of the other surface 12B be also substantially the same. Further, it is preferable that the directions of the directors of liquid crystalline molecules on the surface 12A be substantially parallel to those of the directors of liquid crystalline molecules on the other surface 12B. If the directions of these directors are so controlled, a liquid crystal display, into which the retardation optical element 10 having the function of reflecting ultraviolet light is incorporated, can have improved display performance.

The expression "substantially the same" or "substantially parallel" as used herein also encompasses the case where the direction of the director of a liquid crystalline molecule differs by approximately 180° from that of the director of another liquid crystalline molecule, that is, the head of a liquid crystalline molecule and the tail of another liquid crystalline molecule are in the same direction. This is because, in many cases, the head of a liquid crystalline molecule is optically indistinguishable from its tail.

Next, a retardation optical element having the function of reflecting ultraviolet light, according to another embodiment of the present invention, will be described with reference to FIG. 2.

Figure 2:
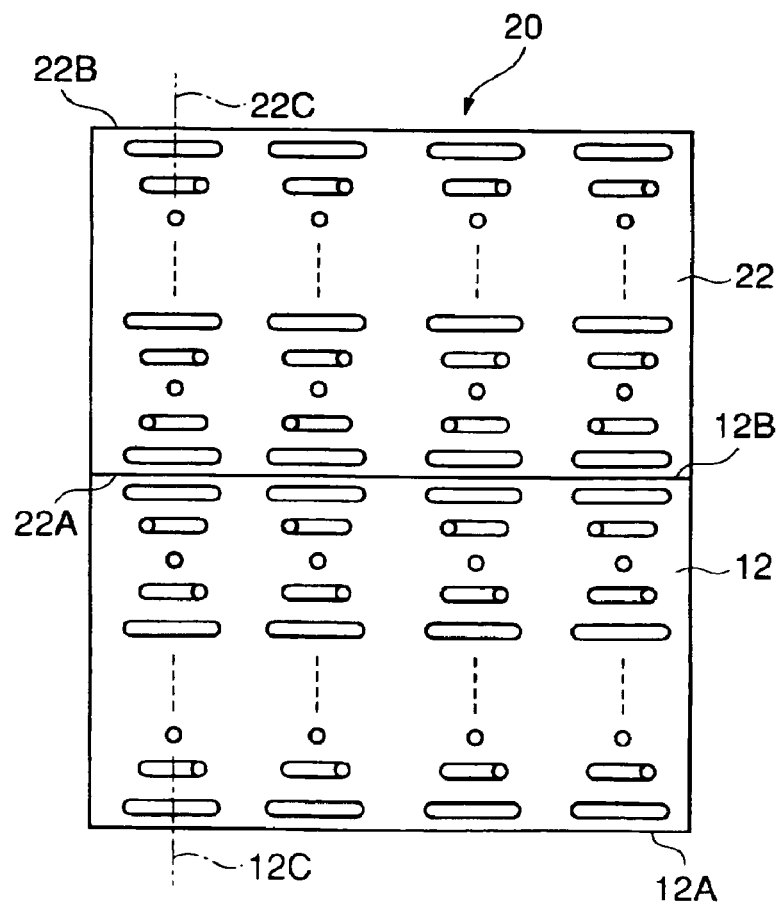
FIG. 2 is a sectional side view diagrammatically showing the structure of a retardation optical element having the function of reflecting ultraviolet light, according to another embodiment of the present invention.

As shown in FIG. 2, the retardation optical element 20 having the function of reflecting ultraviolet light comprises: a first retardation layer 12 that is identical with the retardation layer 12 in the retardation optical element 10 having the function of reflecting ultraviolet light, shown in FIG. 1; and a second retardation layer 22 laminated to this first retardation layer 12.

Like the first retardation layer 12, the second retardation layer 22 has a cholesteric liquid crystalline molecular structure in planar orientation and acts as a negative C plate. Further, like the first retardation layer 12, the second retardation layer 22 is made so that at least part of its selective reflection wave range for light, which the second retardation layer 22 selectively reflects, is included in an ultraviolet region of 100 to 400 nm and that the maximum reflectance for light in this ultraviolet region is 30% or more, more preferably 35% or more.

The first and second retardation layers 12 and 22 are herein made so that the direction of twisting of liquid crystalline molecules in the first retardation layer 12 is opposite to that of twisting of liquid crystalline molecules in the second retardation layer 22. Therefore, if the first retardation layer 12 and the second retardation layer 22 are made to have nearly the same selective reflection wave range, a twofold increase in the maximum reflectance for light in the selective reflection wave range is brought about as a whole, and, as a result, a twofold increase in the maximum reflectance for light in the ultraviolet region is also brought about as a whole (i.e., the maximum reflectance increases to 60% or more, more preferably 70% or more).

Namely, in the case of the retardation optical element 20 having the function of reflecting ultraviolet light, shown in FIG. 2, the first retardation layer 12 reflects one of the right- and left-handed circularly polarized components of light that has a wavelength in the selective reflection wave range and that has entered along the helical axes 12C and 22C of the cholesteric liquid crystalline molecular structures, and the second retardation layer 22 reflects the other component of this light. For this reason, when incorporated into a liquid crystal display or the like, the retardation optical element 20 can decrease the amount of ultraviolet light that enters a liquid crystal cell more effectively than the retardation optical element 10 having the function of reflecting ultraviolet light, which comprises only one retardation layer 12 that reflects only one of the two circularly polarized components.

In the case where the retardation optical element 20 having the function of reflecting ultraviolet light, shown in FIG. 2, is incorporated into a liquid crystal display, its effect of decreasing the amount of ultraviolet light that enters a liquid crystal cell is significantly obtained for ultraviolet light that enters a liquid crystal cell from a back light unit. This effect will be explained hereinafter in more detail.

Firstly, taken as an example is the case where a retardation optical element 10 having the function of reflecting ultraviolet light, which comprises only a retardation layer 12 that reflects right-handed circularly polarized light (ultraviolet light) in its selective reflection wave range, is placed between a back light unit and a liquid crystal cell. In this case, the left-handed circularly polarized component of light (ultraviolet light) emitted from the back light unit passes through the retardation layer 12 and enters the liquid crystal cell, while the right-handed circularly polarized component of the light (ultraviolet light) is reflected from the retardation layer 12 toward the back light unit. Reversion of phase does not occur when the light is reflected from the retardation layer 12, so that the reflected light travels as right-handed circularly polarized light (ultraviolet light) to the back light unit. However, if the reflected light is reflected again from the back light unit, the re-reflected light travels again to the retardation layer 12 as left-handed circularly polarized light (ultraviolet light) that can pass through the retardation layer 12. For this reason, although the light is partly attenuated while it is repeatedly reflected, it finally passes through the retardation layer 12 and enters the liquid crystal cell. Namely, in the case where the retardation optical element 10 having the function of reflecting ultraviolet light, which comprises only a retardation layer 12 that reflects only one of the circularly polarized components, is placed between a back light unit and a liquid crystal cell, even right-handed circularly polarized light (ultraviolet light) reflected from the retardation layer 12 undergoes reversion of the direction of rotation while it is repeatedly reflected, and a part of the rotated light passes through the retardation layer 12 and enters the liquid crystal cell.

On the other hand, in the case where the retardation optical element 20 having the function of reflecting ultraviolet light, shown in FIG. 2, is placed between a back light unit and a liquid crystal cell, reflection of both of the right- and left-handed circularly polarized components of light (ultraviolet light) can be effected by the first retardation layer 12 and the second retardation layer 22. Therefore, both of the right- and left-handed circularly polarized components of light (ultraviolet light) emitted from a back light unit are reflected. In addition, even when these reflected components are re-reflected from the back light unit and travel again to the retardation layers with their phases reversed, they are reflected. For this reason, the two-layer retardation optical element 20 having the function of reflecting ultraviolet light, which comprises the first retardation layer 12 and the second retardation layer 22, can effectively block both of the right- and left-handed circularly polarized components of light (ultraviolet light), and can thus more effectively decrease the amount of ultraviolet light that enters a liquid crystal cell from a back light unit.

With respect to liquid crystalline molecules on two opposite main surfaces (larger surfaces) 22A and 22B of the second retardation layer 22, extending perpendicular to the direction of thickness, in the retardation optical element 20 having the function of reflecting ultraviolet light, shown in FIG. 2, it is preferable, like in the first retardation layer 12, that the directions of the directors of liquid crystalline molecules on the entire area of the surface 22A be substantially the same and that the directions of the directors of liquid crystalline molecules on the entire area of the other surface 22B be also substantially the same. Further, it is preferable that the directions of the directors of liquid crystalline molecules on the surface 22A be substantially parallel to those of the directors of liquid crystalline molecules on the other surface 22B. If the directions of these directors are so controlled, a liquid crystal display, into which the retardation optical element 20 having the function of reflecting ultraviolet light is incorporated, can have improved display performance.

Figure 3A:
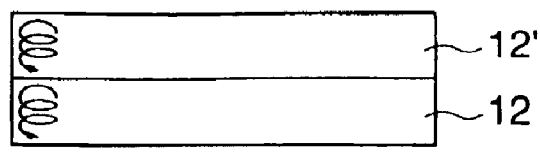
FIGS. 3A and 3B are sectional side views diagrammatically showing the structures of modifications of the retardation optical elements having the function of reflecting ultraviolet light, shown in FIGS. 1 and 2, respectively.
Figure 3B:
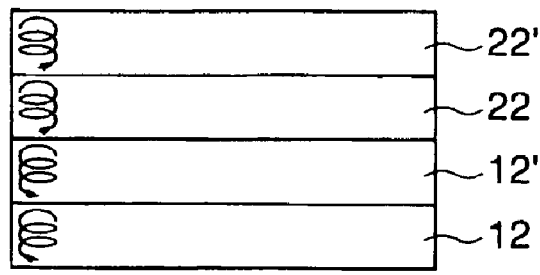

In both of the retardation optical elements 10 and 20 having the function of reflecting ultraviolet light, shown in FIGS. 1 and 2, respectively, an additional retardation layer 12' (22') whose selective reflection wave range is different from that of the retardation layer 12 (22) within an ultraviolet region of 100 to 400 nm (an additional retardation layer in which the direction of twisting (direction of rotation) of liquid crystalline molecules is the same as that of liquid crystalline molecules in the corresponding retardation layer 12 (22)) may be further laminated to the retardation layer 12 (22), as shown in FIGS. 3A and 3B. By forming such an additional retardation layer, it is possible to decrease the amount of ultraviolet light in a wider wave range that enters a liquid crystal cell.

Three-dimensionally cross-linkable liquid crystalline monomers or oligomers (polymerizable monomers or oligomers), as well as polymeric liquid crystals (liquid crystalline polymers) that can be solidified into the glassy state by cooling, can be used as materials for the retardation layers 12 and 22 of the retardation optical elements 10 and 20 having the function of reflecting ultraviolet light, shown in FIGS. 1 and 2, respectively.

In the case where three-dimensionally cross-linkable, polymerizable monomers are used as materials for the retardation layers 12 and 22, it is possible to use mixtures of liquid crystalline monomers and chiral compounds as disclosed in Japanese Laid-Open Patent Publication No. 258638/1995, and Published Japanese Translation No. 508882/1998 of PCT International Publication for Patent Application. In the case where three-dimensionally cross-linkable, polymerizable oligomers are used, it is desirable to use cyclic organopolysiloxane compounds or the like having cholesteric phases as disclosed in Japanese Laid-Open Patent Publication No. 165480/1982. By "three-dimensional cross-linking" is herein meant that liquid crystalline monomer or oligomer molecules are three-dimensionally polymerized to give a network structure. By making the liquid crystalline molecules into such a state, it is possible to optically fix them while retaining them in the state of a cholesteric liquid crystal and thus to obtain a film that is easy to handle as an optical film and stable at normal temperatures.

The case where a three-dimensionally cross-linkable, polymerizable monomer is used is now taken as an example. A chiral nematic liquid crystal (cholesteric liquid crystal) can be obtained if a chiral agent is added to a liquid crystalline monomer having a nematic liquid crystal phase. Specific examples of liquid crystalline monomers that can be used include those ones represented by general formulae (1) to (11-3), for example. In the case of liquid crystalline monomers represented by general formula (11), X is preferably an integer of 2 to 5.

Formulae (1) to (11-3)

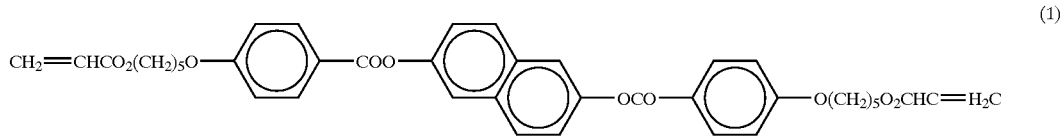
(1)

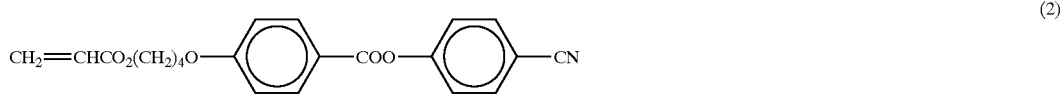
(2)

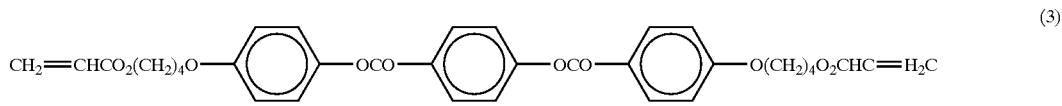
(3)

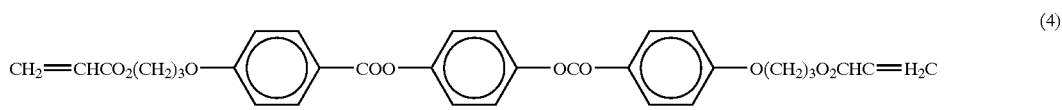
(4)

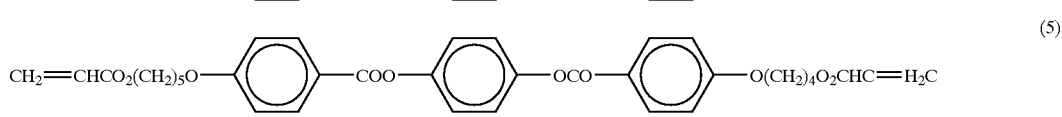
(5)

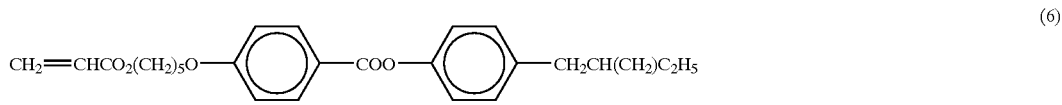
(6)

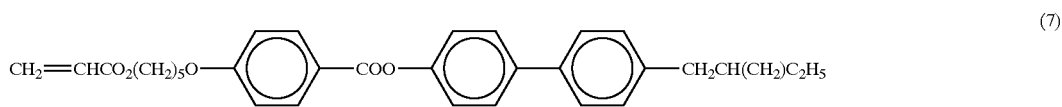
(7)

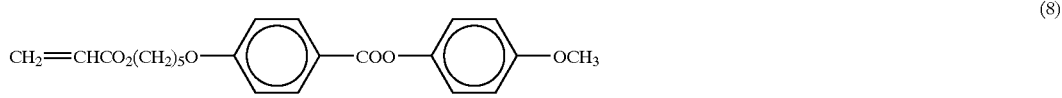
(8)

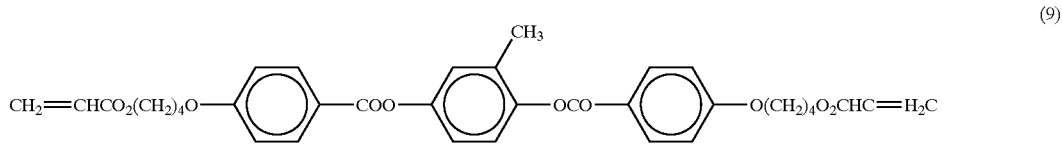
(9)

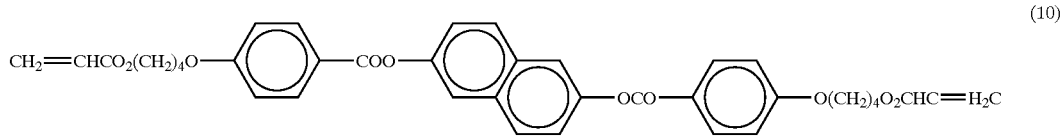
(10)

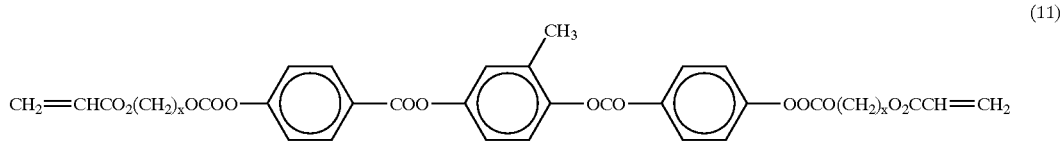
(11)

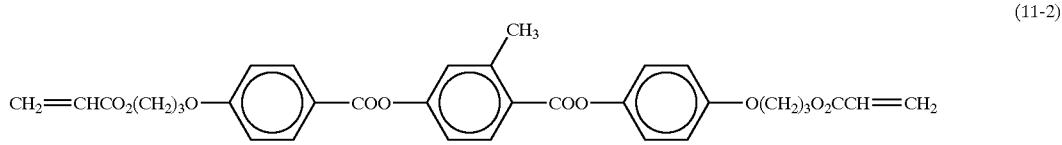
(11-2)

(11-3)

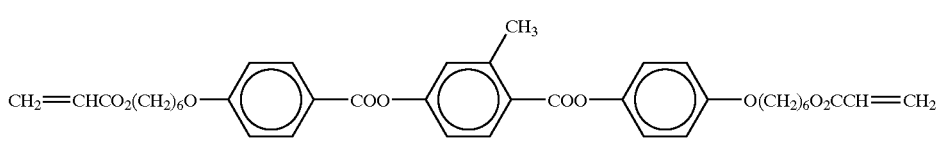

It is preferable to use, as the chiral agent, those compounds represented by general formulae (12) to (14-3), for example. In the case of chiral agents represented by general formulae (12) and (13), X is preferably an integer of 2 to 12; and in the case of chiral agents represented by general formula (14), X is preferably an integer of 2 to 5. In general formula (12), $R^4$ is hydrogen or methyl group.

Formulae (12) to (14-3)

(12)

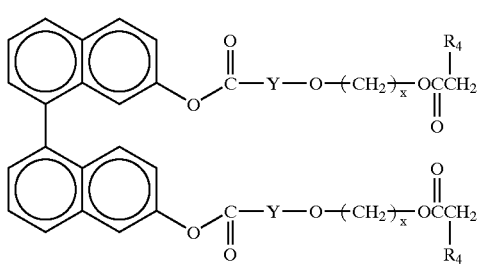

(13)

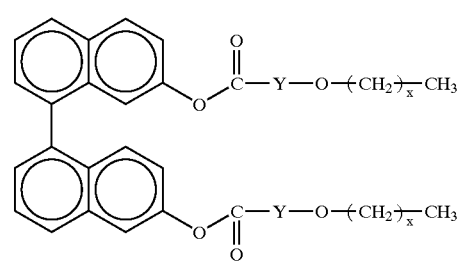

(14)

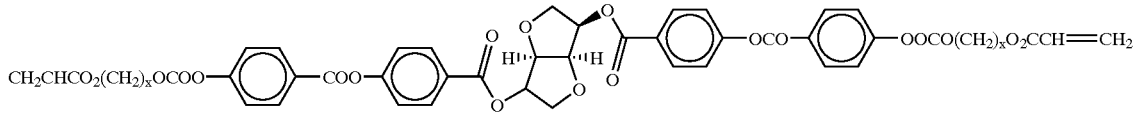

(14-2)

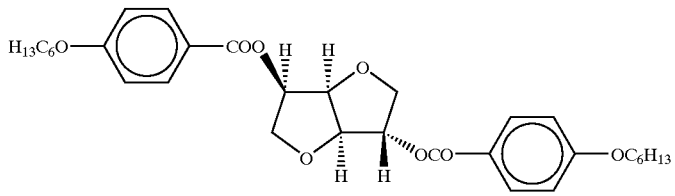

(14-3)

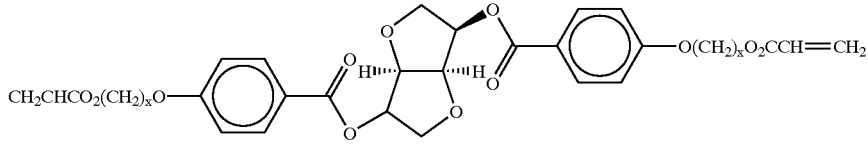

On the other hand, in the case where liquid crystalline polymers are used as materials for the retardation layers 12 and 22, it is possible to use: polymers containing, in their main or side chains or in both of their main and side chains, mesogen groups that make the polymers liquid crystalline; polymeric, cholesteric liquid crystals having cholesteryl groups in their side chains; liquid crystalline polymers as disclosed in Japanese Laid-Open Patent Publication No. 133810/1997; liquid crystalline polymers as disclosed in Japanese Laid-Open Patent Publication No. 293252/1999; and so forth.

Next, processes of producing the retardation optical elements 10 and 20 having the function of reflecting ultraviolet light, shown in FIGS. 1 and 2, respectively, will be described.

First of all, a process of producing the retardation optical element 10 having the function of reflecting ultraviolet light, shown in FIG. 1, will be explained with reference to FIGS. 4(A) to 4(C). Taken herein as an example for explanation is the case where polymerizable monomers (or polymerizable oligomers) are used as materials for the retardation layers 12 and 22.

Figure 4:
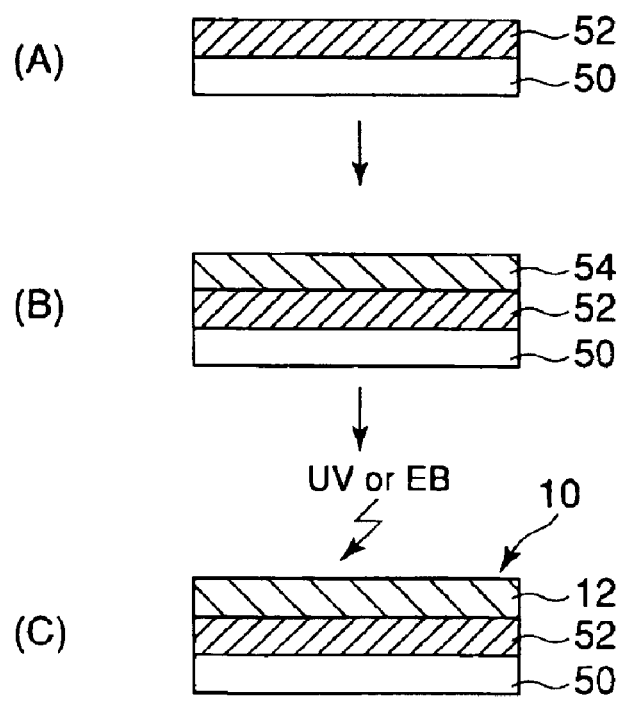
FIG. 4 is a diagrammatic cross-sectional view illustrating a process of producing the retardation optical element having the function of reflecting ultraviolet light, shown in FIG. 1.
Figure 5:
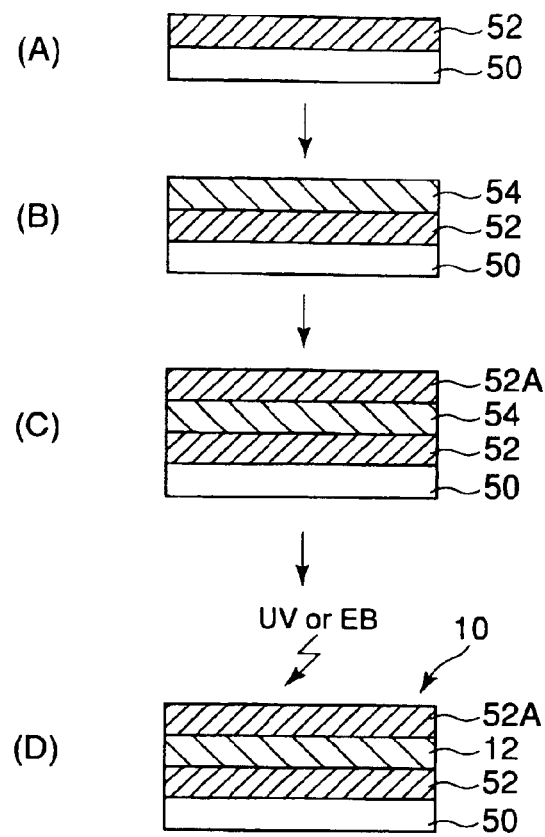
FIG. 5 is a diagrammatic cross-sectional view illustrating another process of producing the retardation optical element having the function of reflecting ultraviolet light, shown in FIG. 1.

In this process, an alignment layer 52 is firstly formed on a glass substrate (or a polymeric film such as a TAC (cellulose triacetate) film) 50, as shown in FIG. 4(A). A polymerizable monomer (or polymerizable oligomer) 54 is, as shown in FIG. 4(B), applied to this alignment layer 52 and is aligned with one surface of the applied layer being regulated by the alignment regulation power of the alignment layer 52. At this time, the applied polymerizable monomer (or polymerizable oligomer) 54 forms a liquid crystal layer.

Next, polymerization of the polymerizable monomer (or polymerizable oligomer) 54 in this state of alignment is initiated by the combination use of a photopolymerization initiator previously added and ultraviolet light (UV) externally applied, or directly initiated by the application of an electron beam (EB), as shown in FIG. 4(C), thereby three-dimensionally cross-linking (polymerizing) and solidifying the polymerizable monomer (or polymerizable oligomer)

54. Thus, there is obtained a single-layer retardation optical element 10 having the function of reflecting ultraviolet light, which comprises one retardation layer 12 as mentioned above.

If the alignment layer 52 has been made so that its entire surface exerts alignment regulation power in substantially one direction, the directions of the directors of those liquid crystalline molecules that are brought into contact with this alignment layer 52 become substantially the same within the contact face.

In this case, in order to make, substantially the same, the directions of the directors of liquid crystalline molecules on the entire surface of the retardation layer 12 on the side apart from the alignment layer 52, it is proper to make the thickness of the retardation layer 12 uniform. Alternatively, as shown in FIGS. 5(A) to 5(D), the following step may be effected after applying the polymerizable monomer (polymerizable oligomer) 54 to the alignment layer 52 and before three-dimensionally cross-linking it in the process shown in FIGS. 4(A) to 4(C): a second alignment layer 52A is laid on the applied polymerizable monomer (polymerizable oligomer) 54 (FIG. 5(C)). As in the step shown in FIG. 4(C), the polymerizable monomer (polymerizable oligomer) 54 sandwiched between the alignment layer 52 and the second alignment layer 52A is three-dimensionally cross-linked by the application of ultraviolet light (UV) or an electron beam (EB) (FIG. 5(D)). The second alignment layer 52A may be separated from the retardation layer 12 after the application of ultraviolet light or an electron beam.

Further, in the processes shown in FIGS. 4(A) to 4(C) and in FIGS. 5(A) to 5(D), it is also possible to make the directions of the directors of liquid crystalline molecules on the two opposite surfaces of the retardation layer 12 parallel to each other.

In this case, it is preferable, in the process shown in FIGS. 4(A) to 4(C), to make the thickness of the retardation layer 12 equal to (0.5×integer) times the helical pitch p in the helical structure consisting of liquid crystalline molecules. If the thickness is so made, it can be optically divided, without a remainder, by a half of the helical pitch p of cholesteric liquid crystalline molecules, and the directions of the directors of liquid crystalline molecules on the two opposite surfaces of the retardation layer 12 become parallel to each other. On the other hand, in the process shown in FIGS. 5(A) to 5(D), the second alignment layer 52A is provided so that the direction in which the second alignment layer 52A exerts alignment regulation power is the same as that in which the alignment layer 52 exerts alignment regulation power.

In the processes shown in FIGS. 4(A) to 4(C) and in FIGS. 5(A) to 5(D), in order to decrease the viscosity of the polymerizable monomer (or polymerizable oligomer) 54 for easy application, it may be dissolved in a solvent to give a coating liquid. If such a coating liquid is used, it is necessary to effect the drying step of evaporating the solvent before three-dimensionally cross-linking the polymerizable monomer (or polymerizable oligomer) 54 by the application of ultraviolet light or an electron beam. Preferably, after effecting the step of applying the coating liquid, the drying step of evaporating the solvent and then the step of aligning the liquid crystal are effected.

If the polymerizable monomer (or polymerizable oligomer) 54 is made into a liquid crystal layer at a predetermined temperature, the resulting liquid crystal layer is nematic. This nematic liquid crystal layer develops a chiral nematic liquid crystalline phase (cholesteric liquid crystalline phase) if any chiral agent is added to it. Specifically, it is proper to add a chiral agent to the polymerizable monomer or oligomer in an amount of several to 10%, for example.

The chiral agent that is added in the above-described manner is one of an isomeric pair of chemical compounds whose molecules are non-superimposable mirror images. If such a chiral agent is selectively added to the nematic liquid crystal component, there can freely be obtained one of the cholesteric liquid crystalline molecular structures that are different in the direction of twisting (direction of rotation) of liquid crystalline molecules (a structure capable of selectively reflecting either right- or left-handed circularly polarized light).

Further, by varying the chiral power by changing the type of the chiral agent that is added to the polymerizable monomer (or polymerizable oligomer) 54, or by changing the concentration of the chiral agent, it is possible to control the selective reflection wave range originating from the liquid crystalline molecular structure of the polymerizable monomer or oligomer.

The alignment layer 52 and/or the second alignment layer 52A can be formed by a conventionally known method. For example, it is possible to use the method in which a PI (polyimide) or PVA (polyvinyl alcohol) film is formed on the above-described glass substrate (or a polymeric film such as a TAC (cellulose triacetate) film) 50 and is then rubbed, or the method in which a polymeric compound film that can serve as an optical alignment layer is formed on a glass substrate (or a polymeric film such as a TAC (cellulose triacetate) film) 50 and is then irradiated with polarized UV (ultraviolet light) In addition, oriented PET (polyethylene terephthalate) films and the like can also be used for the alignment layers.

Next, a process of producing the retardation optical element 20 having the function of reflecting ultraviolet light, shown in FIG. 2, will be explained with reference to FIGS. 7(A) to 7(E).

In this process, a polymerizable monomer (or polymerizable oligomer) 54 is applied, as shown in FIGS. 7(A) to 7(C), to an alignment layer 52 formed on a glass substrate (or a polymeric film such as a TAC (cellulose triacetate) film) 50, in the same manner as in the process shown in FIGS. 4(A) to 4(C), thereby forming a first retardation layer 12.

A polymerizable monomer (or polymerizable oligomer) 56 in which the direction of twisting (direction of rotation) of the helical structure consisting of liquid crystalline molecules is opposite to that of twisting of the helical structure in the above-described polymerizable monomer (or polymerizable oligomer) 54 is then separately prepared. At this time, the polymerizable monomer (or polymerizable oligomer) 56 and the polymerizable monomer (or polymerizable oligomer) 54 contain substantially the same nematic liquid crystal component, and the direction of twisting of liquid crystalline molecules in the polymerizable monomer (or polymerizable oligomer) 56 is made opposite to that of twisting of liquid crystalline molecules in the polymerizable monomer (or polymerizable oligomer) 54 by varying the type of a chiral agent component that is added to the nematic liquid crystal component.

The polymerizable monomer (or polymerizable oligomer) 56 thus prepared is applied directly to the first retardation layer 12, and is aligned with one surface of the applied layer being regulated by the alignment regulation power of the surface of the first retardation layer 12, as shown in FIG. 7(D). In this state of alignment, the polymerizable monomer (or polymerizable oligomer) 56 is three-dimensionally cross-linked and solidified, in the same manner as in the step shown in FIG. 4(C), by the combination use of ultraviolet light and a photopolymerization initiator or by the application of an electron beam alone, as shown in FIG. 7(E), thereby forming a second retardation layer 22. There is thus produced a two-layer retardation optical element 20 having the function of reflecting ultraviolet light.

To obtain a multilayer retardation optical element comprising three or more retardation layers, the above-described steps (FIGS. 7(D) and 7(E)) are repeated to successively laminate a required number of retardation layers.

Although the polymerizable monomer (or polymerizable oligomer) 56 is applied directly to the first retardation layer 12 in the process shown in FIGS. 7(A) to 7(E), the following manner may also be adopted: an alignment layer is formed on the first retardation layer 12, and the polymerizable monomer (or polymerizable oligomer) 56 is aligned with one surface of the applied layer being regulated by the alignment regulation power of this alignment layer, and is three-dimensionally cross-linked and solidified. Further, when three-dimensionally cross-linking and solidifying the second retardation layer 22, the directions of the directors of liquid crystalline molecules on the surface of the second retardation layer 22 on the side opposite to the first retardation layer 12 may be made substantially the same in the above-described manner using a second alignment layer. In the production of a multilayer retardation optical element comprising three or more retardation layers, this step can be effected for the third and later retardation layers.

Figure 6:
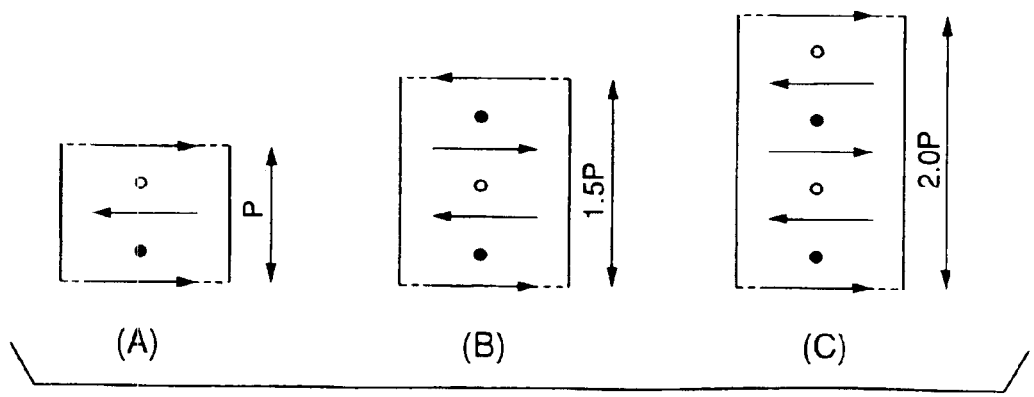
FIG. 6 is a diagrammatic view showing the relationship between the helical pitch in a helical structure consisting of cholesteric liquid crystalline molecules and the directors of liquid crystalline molecules on the surfaces of a retardation layer.

With respect also to the second retardation layer 22, it is preferable, as in the case of the first retardation layer 12, to make its thickness equal to (0.5× integer) times the helical pitch p in the helical structure consisting of liquid crystalline molecules, as shown in FIGS. 6(A) to 6(C), or to provide a second alignment layer so that the direction in which it exerts alignment regulation power is the same as that in which the alignment layer 52 exerts alignment regulation power. By doing so, it is possible to surely make the directions of the directors of liquid crystalline molecules on both surfaces of the first and second retardation layers 12 and 22 parallel to each other.

In the above description, taken as an example is the case where polymerizable monomers (or polymerizable oligomers) are used as materials for the retardation layers 12 and 22. It is, however, also possible to use polymeric liquid crystals (liquid crystalline polymers) as materials for the retardation layers 12 and 22, as mentioned above.

In this case, an alignment layer 52 is, as in the above-described case, firstly formed on a glass substrate (or a polymeric film such as a TAC (cellulose triacetate) film) 50 in the step shown in FIG. 4(A).

Thereafter, in the step shown in FIG. 4(B), a liquid crystalline polymer is applied, instead of the polymerizable monomer (or polymerizable oligomer) 54, to the alignment layer 52, and is aligned with one surface of the applied layer being regulated by the alignment regulation power of the alignment layer 52.

By cooling to room temperature, instead of applying ultraviolet light (UV) or an electron beam (EB), the liquid crystalline polymer is then solidified into the glassy state. There is thus obtained a single-layer retardation optical element 10 having the function of reflecting ultraviolet light, which comprises one retardation layer 12.

In this process, in order to decrease the viscosity of the liquid crystalline polymer for easy application, it may be dissolved in a solvent to give a coating liquid. If such a coating liquid is used, it is necessary to effect, before cooling, the drying step of evaporating the solvent. Preferably, after effecting the step of applying the coating liquid, the drying step of evaporating the solvent and then the step of aligning the liquid crystal are effected.

Cholesteric liquid crystalline polymers having chiral power, as well as mixtures of nematic liquid crystalline polymers and cholesteric liquid crystalline polymers may be used for the liquid crystalline polymer.

These liquid crystalline polymers change from one state to the other with temperature. For example, a liquid crystalline polymer having a glass transition temperature of 90° C. and an isotropic transition temperature of 200° C. is in the cholesteric liquid crystalline state when the temperature is between 90° C. and 200° C.; by cooling to room temperature, it is possible to solidify this polymer into the glassy state while retaining its cholesteric structure.

To control the selective reflection wave range originating from the cholesteric liquid crystalline molecular structure of a liquid crystalline polymer, it is proper to control, in the case where a cholesteric liquid crystalline polymer is used, the chiral power of the liquid crystalline molecules by a conventionally known method. In the case where a mixture of a nematic liquid crystalline polymer and a cholesteric liquid crystalline polymer is used, it is proper for this purpose to control the mixing ratio between the two polymers.

Also in the above-described production process, in order to control the directions of the directors of liquid crystalline molecules on the surface of the liquid crystalline polymer layer on the side apart from the alignment layer 52, a second alignment layer 52A may be provided on this surface as in the process shown in FIGS. 5(A) to 5(D).

Further, as in the process shown in FIGS. 7(A) to 7(E), a second retardation layer 22 may be formed on the first retardation layer 12 made from a liquid crystalline polymer, by applying thereto another liquid crystalline polymer which the direction of twisting (direction of rotation) of the helical structure consisting of liquid crystalline molecules is opposite to that of twisting of the helical structure consisting of liquid crystalline molecules in the above-described liquid crystalline polymer.

In this case, in the step shown in FIG. 7(D), the liquid crystalline polymer as described above is applied, instead of the polymerizable monomer (or polymerizable oligomer) 56, to the first retardation layer 12, and is aligned with one surface of the applied layer being regulated by the alignment regulation power of the alignment layer 52.

In the step shown in FIG. 7(E), the liquid crystalline molecules are solidified into the glassy state by cooling the liquid crystalline polymer to room temperature, instead of applying ultraviolet light (UV) or an electron beam (EB). There is thus produced a two-layer retardation optical element 20 having the function of reflecting ultraviolet light, which comprises two retardation layers 12 and 22.

Next, a liquid crystal display, into which the retardation optical element 10 or 20 having the function of reflecting ultraviolet light, according to the above-described embodiment, is incorporated, will be described with reference to FIG. 8.

Figure 8:
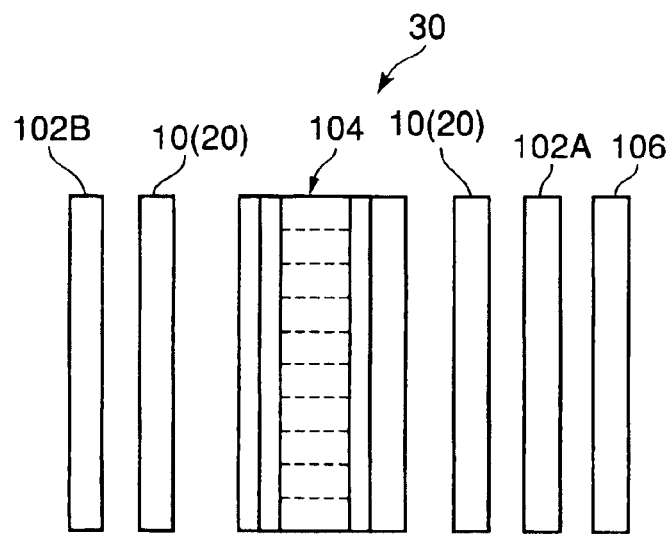
FIG. 8 is a side view diagrammatically showing the structure of a liquid crystal display into which the retardation optical element having the function of reflecting ultraviolet light, shown in FIG. 1 or 2, is incorporated.

As shown in FIG. 8, a liquid crystal display 30 comprises a polarization layer 102A on the incident side, a polarization layer 102B on the emergent side, a liquid crystal cell 104, and a back light unit 106. In addition, the retardation optical elements 10 (20) having the function of reflecting ultraviolet light, according to the aforementioned embodiment, are placed on both sides, relative to the direction of thickness, of the liquid crystal cell 104 (between the liquid crystal cell 104 and the polarization layer 102A on the incident side and between the liquid crystal cell 104 and the polarization layer 102B on the emergent side).

Of these component parts, the polarization layers 102A and 102B are made so that they selectively transmit only linearly polarized light having a plane of vibration in a predetermined direction, and are arranged in the cross nicol disposition so that the direction of vibration of linearly polarized light which the polarization layer 102A transmits is perpendicular to that of vibration of linearly polarized light which the polarization layer 102B transmits. The liquid crystal cell 104 comprises a large number of cells corresponding to pixels, and is placed between the polarization layers 102A and 102B.

In the liquid crystal display 30, the liquid crystal cell 104 is of VA mode, in which a nematic liquid crystal having negative dielectric anisotropy is sealed in the liquid crystal cell. Linearly polarized light that has passed through the polarization layer 102A on the incident side passes, without undergoing phase shift, through those cells in the liquid crystal cell 104 that are in the non-driven state, and is blocked by the polarization layer 102B on the emergent side. On the contrary, the linearly polarized light undergoes phase shift as it passes through those cells in the liquid crystal cell 104 that are in the driven state, and the light in an amount corresponding to the amount of this phase shift passes through and emerges from the polarization layer 102B on the emergent side. It is therefore possible to display the desired image on the emergent-side polarization layer 102B side by properly controlling the driving voltage that is applied to each cell in the liquid crystal cell 104.

In the liquid crystal display 30 of such a construction, the retardation optical elements 10 (20) having the function of reflecting ultraviolet light, according to the aforementioned embodiment, are placed between the liquid crystal cell 104 and the polarization layer 102A on the incident side and between the liquid crystal cell 104 and the polarization layer 102B on the emergent side, whereby, of the light in a predetermined state of polarization that has emerged from or entered the liquid crystal cell 104, the light emerging in the direction deviating from the normal to the liquid crystal cell 104 can be compensated for its state of polarization by the retardation optical elements 10 (20) having the function of reflecting ultraviolet light.

The liquid crystal display 30 shown in FIG. 8 is of transmission type, in which light passes from one side to the other in the direction of thickness. The present embodiment is not limited to a liquid crystal display of this type, and it is also possible to use the retardation optical element 10 (20) having the function of reflecting ultraviolet light, according to the aforementioned embodiment, by similarly incorporating it into a liquid crystal display of reflection type or of reflection-transmission type.

In the liquid crystal display 30 shown in FIG. 8, the retardation optical elements 10 (20) having the function of reflecting ultraviolet light, according to the aforementioned embodiment, are placed on both sides, relative to the direction of thickness, of the liquid crystal cell 104 (between the liquid crystal cell 104 and the polarization layer 102A on the incident side and between the liquid crystal cell 104 and the polarization layer 102B on the emergent side). However, depending on the type of the intended optical compensation, the retardation optical element 10 (20) having the function of reflecting ultraviolet light may be placed only on one side, relative to the direction of thickness, of the liquid crystal cell 104. In addition, not only one but also two or more of the retardation optical elements having the function of reflecting ultraviolet light may be placed between the liquid crystal cell 104 and the polarization layer 102A on the incident side or between the liquid crystal cell 104 and the polarization layer 102B on the emergent side.

As mentioned above, according to the liquid crystal display 30 of the above-described construction, since the retardation optical elements 10 (20) having the function of reflecting ultraviolet light, capable of decreasing the amount of ultraviolet light that enters the liquid crystal cell 104, are provided, the liquid crystal sealed in the liquid crystal cell 104 hardly undergoes deterioration. There can thus be obtained a liquid crystal display excellent in durability, and having high reliability. Moreover, the retardation optical element 10 (20) that is incorporated into the liquid crystal display 30 has not only the function of reflecting ultraviolet light but also the function of providing optical compensation utilizing phase shift or the like, so that the liquid crystal display 30 requires only a decreased number of parts. It is therefore possible to produce, at low cost, a liquid crystal display that is compact and excellent in durability.

EXAMPLES

Examples of the aforementioned embodiments will now be given together with Comparative Example.

Example 1

In Example 1, a single-layer retardation optical element having the function of reflecting ultraviolet light, which comprises a retardation layer, was produced by the use of a polymerizable monomer.

A toluene solution containing a chiral nematic (cholesteric) liquid crystal was prepared by dissolving: 90 parts of a monomer containing, in its molecule, polymerizable acrylates at both ends and spacers between mesogen existing at the center and the acrylates, and having a nematic-isotropic transition temperature of 110° C.; and 6 parts of a chiral agent having polymerizable acrylates at both ends of its molecule. To this toluene solution, a photopolymerization initiator ("Irgacure® 907" available from Ciba Specialty Chemicals K.K., Japan) was added in an amount of 5% by weight of the above-described monomer (with respect to a chiral nematic liquid crystal obtained in this manner, it was confirmed that the directions of the directors of liquid crystalline molecules that were brought into contact with the interfacial-side surface of an alignment layer became the same as the direction of rubbing within plus or minus 5 degrees).

On the other hand, a transparent glass substrate was spin-coated with polyimide ("Optomer® AL1254" manufactured by JSR Corporation, Japan) dissolved in a solvent. After drying, a film of the polyimide (film thickness: 0.1 μm) was formed at 200° C., and was rubbed in one direction so that it could function as an alignment layer.

The glass substrate coated with the alignment layer was set in a spin-coater, and was spin-coated with the toluene solution containing the above-described monomer and so on under such conditions that the thickness of the resulting film would be as uniform as possible.

The toluene contained in the above toluene solution was then evaporated at 80° C. to form a coating film. It was confirmed by the selective reflection of light that this coating film on the alignment layer was cholesteric.

Ultraviolet light was applied to the above coating film, and with radicals thus released from the photopolymerization initiator contained in the coating film, the acrylates in the monomer molecules were three-dimensionally crosslinked to polymerize the monomer, thereby producing a single-layer retardation optical element having the function of reflecting ultraviolet light, which comprises one retardation layer. The film thickness of this retardation layer was found to be 2 μm±1.5%.

Figure 9:
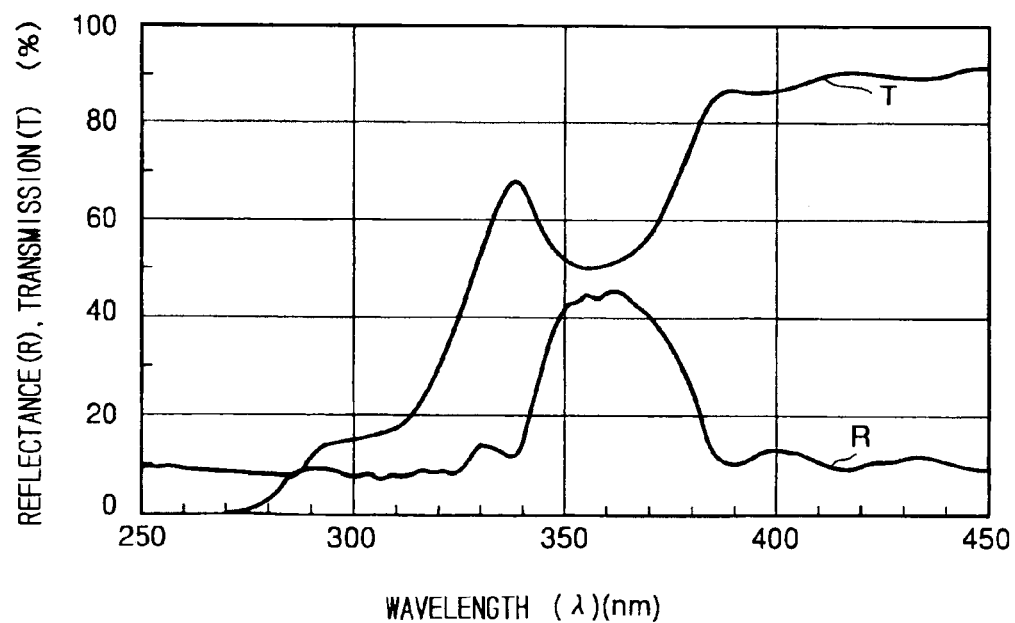
FIG. 9 is a graph showing the relationships between reflectance R (%) and wavelength λ (nm) and between transmission T (%) and wavelength λ (nm) in the single-layer retardation optical element of Example 1, having the function of reflecting ultraviolet light.
Figure 12:
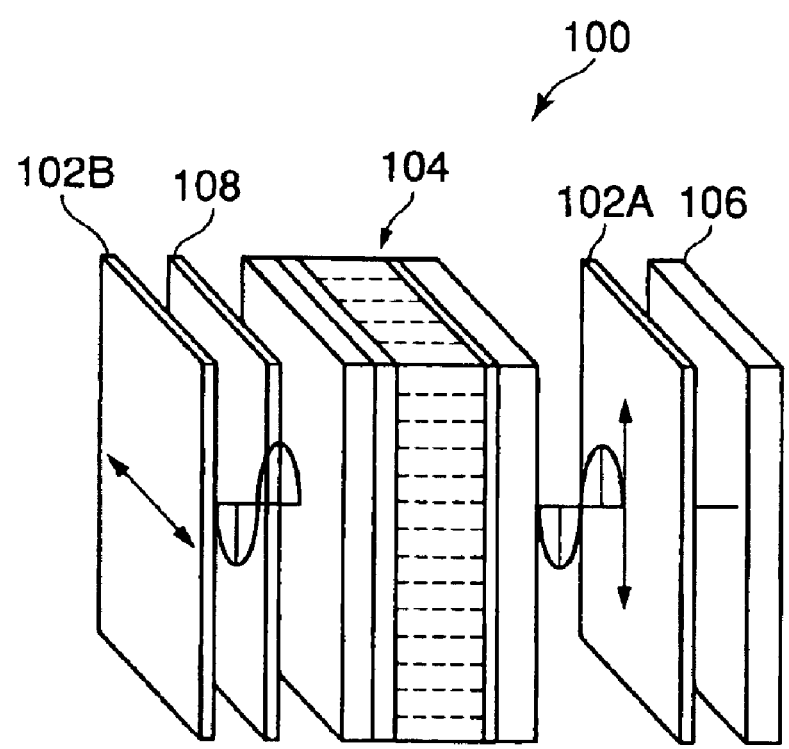
FIG. 12 is an exploded, diagrammatic perspective view showing a conventional liquid crystal display.

The retardation optical element having the function of reflecting ultraviolet light, produced in the above-described manner, was subjected to measurement using a spectrophotometer. Specifically, the measurement was made using a spectrophotometer by allowing ultraviolet light and visible light of 250 to 450 nm to enter the retardation optical element having the function of reflecting ultraviolet light, at an angle of 5° with the normal to the retardation optical element, and causing the retardation optical element to reflect the light at the angle. As a result, it was found as shown in FIG. 9 that the retardation layer had a selective reflection wave range whose central wavelength was 360 nm and that a large part of the selective reflection wave range was included in an ultraviolet region of not more than 400 nm. More specifically, the maximum reflectance R (%) for light in the ultraviolet region (100 to 400 nm) was obtained when the retardation optical element having the function of reflecting ultraviolet light was irradiated with ultraviolet light with a wavelength $\lambda$ of 360 nm, where the maximum reflectance R (%) was 44% (above 30%).

Example 2

In Example 2, a two-layer retardation optical element having the function of reflecting ultraviolet light, which comprises two retardation layers, was produced by the use of a polymerizable monomer.

The retardation layer contained in the retardation optical element having the function of reflecting ultraviolet light, produced in Example 1, was herein used as the first retardation layer. The surface of this retardation layer on the side opposite to the alignment layer was spin-coated with a toluene solution prepared in the same manner as in Example 1 (provided that 6 parts of a chiral agent that was an optical isomer of the chiral agent used in Example 1, the molecular configuration of the optical isomer being a mirror image of the chiral agent used in Example 1, was employed in place of the chiral agent in Example 1) at the same number of revolutions as in Example 1.

The toluene contained in the above toluene solution was then evaporated at 80° C. to form a coating film. It was confirmed by the selective reflection of light that this coating film formed on the first retardation layer was cholesteric.

Ultraviolet light was applied to the above coating film, and with radicals thus released from the photopolymerization initiator contained in the coating film, the acrylates in the monomer molecules were three-dimensionally crosslinked to polymerize the monomer, thereby producing a two-layer retardation optical element having the function of reflecting ultraviolet light, which comprises the first retardation layer and the second retardation layer formed thereon. The total film thickness of these retardation layers was found to be 4.0 μm±1.5%.

The retardation optical element having the function of reflecting ultraviolet light, produced in the above-described manner, was subjected to measurement using a spectrophotometer. Specifically, the measurement was made using a spectrophotometer by allowing ultraviolet light and visible light of 250 to 450 nm to enter the retardation optical element having the function of reflecting ultraviolet light, at an angle of 50 with the normal to the retardation optical element, and causing the retardation optical element to reflect the light at the angle. As a result, it was found that, like the retardation layer formed in Example 1 (the first retardation layer), the second retardation layer had a selective reflection wave range whose central wavelength was 360 nm and that a large part of the selective reflection wave range was included in an ultraviolet region of not more than 400 nm. More specifically, the maximum reflectance R (%) for light in the ultraviolet region (100 to 400 nm) was obtained when the retardation optical element having the function of reflecting ultraviolet light was irradiated with ultraviolet light with a wavelength $\lambda$ of 360 nm, where the maximum reflectance R (%) was 88% (above 60%).

Example 3

In Example 3, a single-layer retardation optical element having the function of reflecting ultraviolet light, which comprises one retardation layer, was produced by the use of a liquid crystalline polymer.

A toluene solution containing a polymeric, cholesteric liquid crystal was prepared by dissolving a liquid crystalline polymer containing acrylic side chains, and having a glass transition temperature of 80° C. and an isotropic transition temperature of 200° C. (with respect to a polymeric, cholesteric liquid crystal obtained in this manner, it was confirmed that the directions of the directors of liquid crystalline molecules that were brought into contact with the interfacial-side surface of an alignment layer became the same as the direction of rubbing within plus or minus 5 degrees).

On the other hand, a transparent glass substrate was spin-coated with polyimide ("Optomer®") AL1254" manufactured by JSR Corporation, Japan) dissolved in a solvent. After drying, a film of the polyimide (film thickness: 0.1 μm) was formed at 200° C., and was rubbed in one direction so that it could function as an alignment layer.

The glass substrate coated with the alignment layer was set in a spin-coater, and was spin-coated with the toluene solution containing the above-described liquid crystalline polymer under such conditions that the thickness of the resulting film would be as uniform as possible.

The toluene contained in the above toluene solution was then evaporated at 90° C., and the coating film formed on the alignment layer was held at 150° C. for 10 minutes. It was confirmed by the selective reflection of light that this coating film was cholesteric. Thereafter, the coating film was cooled to room temperature to solidify the liquid crystalline polymer into the glassy state, thereby obtaining a single-layer retardation optical element having the function of reflecting ultraviolet light, which comprises one retardation layer. The film thickness of this retardation layer was found to be 2 μm±1.5%.

The retardation optical element having the function of reflecting ultraviolet light, produced in the above-described manner, was subjected to measurement using a spectrophotometer. Specifically, the measurement was made using a spectrophotometer by allowing ultraviolet light and visible light of 250 to 450 nm to enter the retardation optical element having the function of reflecting ultraviolet light, at an angle of 50 with the normal to the retardation optical element, and causing the retardation optical element to reflect the light at the angle. As a result, it was found as shown in FIG. 10 that the retardation layer had a selective reflection wave range whose central wavelength was 405 nm and that a part of the selective reflection wave range was included in an ultraviolet region of not more than 400 nm. More specifically, the maximum reflectance R (%) for light in the ultraviolet region (100 to 400 nm) was obtained when the retardation optical element having the function of reflecting ultraviolet light was irradiated with ultraviolet light with a wavelength λ of 400 nm, where the maximum reflectance R (%) was 40% (above 30%).

Comparative Example

In Comparative Example, measurement was made using a spectrophotometer by allowing ultraviolet light and visible light of 250 to 450 nm to enter a transparent glass at an angle of 5° with the normal to the glass, and causing the glass to reflect the light at the angle. As a result, it was found that the reflectances R (%) were, as shown in FIG. 11, constant at approximately 10% irrespective of the wavelengths λ (nm).

RESULTS OF EVALUATION

Each one of the retardation optical elements of Examples 1 to 3, having the function of reflecting ultraviolet light, and the transparent glass of Comparative Example was incorporated into a liquid crystal display as shown in FIG. 8 and evaluated. As a result, it was found that all of the retardation optical elements of Examples 1 to 3, having the function of reflecting ultraviolet light, were able to decrease the amount of ultraviolet light entering the liquid crystal cell more greatly than the transparent glass of Comparative Example.

What is claimed is:

1. A retardation optical element having a function of reflecting ultraviolet light, comprising:
   a first retardation layer that has a cholesteric liquid crystalline molecular structure and acts as a negative C plate; and
   a second retardation layer laminated to the first retardation layer, the second retardation layer having a cholesteric liquid crystalline molecular structure and acting as a negative C plate,
   wherein the first and second retardation layers are made so that a direction of twisting of liquid crystalline molecules in the first retardation layer is opposite to that of twisting of liquid crystalline molecules in the second retardation layer, that at least part of the selective reflection wave range of the first retardation layer and at least part of the selective reflection wave range of the second retardation layer are both included in an ultraviolet region of 100 to 400 nm, and that a maximum reflectance for light in the ultraviolet region is 60% or more as a whole.

2. The retardation optical element according to claim 1, wherein the structure of the first retardation layer and that of the second retardation layer are those of chiral nematic liquid crystals that have been three-dimensionally cross-linked and solidified.

3. The retardation optical element according to claim 2, wherein the first and second retardation layers contain substantially the same nematic liquid crystal component, and the direction of twisting of liquid crystalline molecule, in the first retardation layer is made opposite to that of twisting of liquid crystalline molecules in the second retardation layer by varying a type of a chiral agent component that is added to the nematic liquid crystal component.

4. The retardation optical element according to claim 1, wherein the structure of the first retardation layer and that of the second retardation layer are those of polymeric liquid crystals that have been solidified into a glassy state.

5. The retardation optical element according to claim 1, further comprising an additional retardation layer laminated to the first or second retardation layer, the additional retardation layer having a selective reflection wave range different in the ultraviolet region from that of the first or second retardation layer.

6. A liquid crystal display comprising:
   a liquid crystal cell; and
   a retardation optical element having a function of reflecting ultraviolet light, as set forth in claim 1, the retardation optical element being placed on at least one side, relative to a direction of thickness, of the liquid crystal cell,
   wherein the retardation optical element having the function of reflecting ultraviolet light selectively reflects light in a predetermined state of polarization, in an ultraviolet region that constitutes a part of its selective reflection wave range, thereby decreasing an amount of ultraviolet light that enters the liquid crystal cell.

* * * * *